United States Patent [19]
Parmentier

[11] 3,762,551
[45] Oct. 2, 1973

[54] SLURRY CONCENTRATOR AND FILTER APPARATUS

[76] Inventor: Alfred Henri Parmentier, La Bruyere, 3, Lillois, Belgium

[22] Filed: Apr. 15, 1971

[21] Appl. No.: 134,149

[30] Foreign Application Priority Data
Aug. 11, 1970  Luxembourg .......................... 61497
Mar. 31, 1971  Luxembourg .......................... 62884

[52] U.S. Cl. .............................. 210/141, 210/334
[51] Int. Cl. ............................................ B01d 29/38
[58] Field of Search .................... 210/332, 334, 138, 210/141

[56] References Cited
UNITED STATES PATENTS

| | | | |
|---|---|---|---|
| 2,368,636 | 2/1945 | Bottaro | 210/334 |
| 1,169,725 | 1/1916 | Kilby | 210/334 |
| 170,952 | 12/1875 | Hutchinson | 210/334 |
| 1,609,265 | 11/1926 | Menge | 210/334 |
| 1,996,000 | 3/1935 | Horquist | 210/334 |
| 2,609,101 | 9/1952 | Howland et al | 210/334 |

*Primary Examiner*—Frank A. Spear, Jr.
*Attorney*—Polachek & Saulsbury

[57] ABSTRACT

A slurry concentrator and filter comprises a reservoir for slurry formed with a tapered hopper at the bottom. Stationary pipes extend across the reservoir and carry vertical filter cells having flat screens on opposite sides. A frame structure is movably mounted in the reservoir and carries scraper blades to scrape collected concentrated slurry material from the screens. The frame structure can be arranged to move vertically or horizontally. The frame structure can be reciprocated by a hydraulic cylinder. Spray nozzles can be mounted on the frame structure to wash the screens as the frame structure moves across the screens.

3 Claims, 6 Drawing Figures

INVENTOR.
ALFRED OENRI PARMENTIER

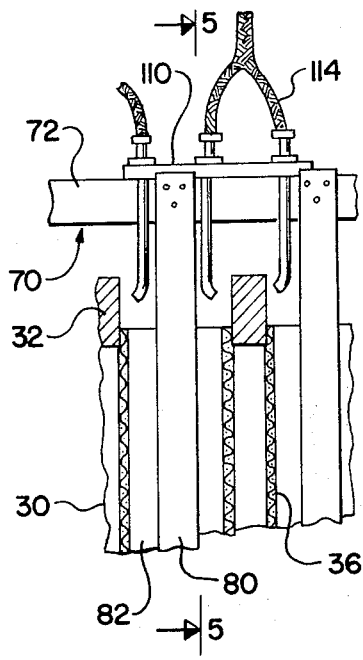
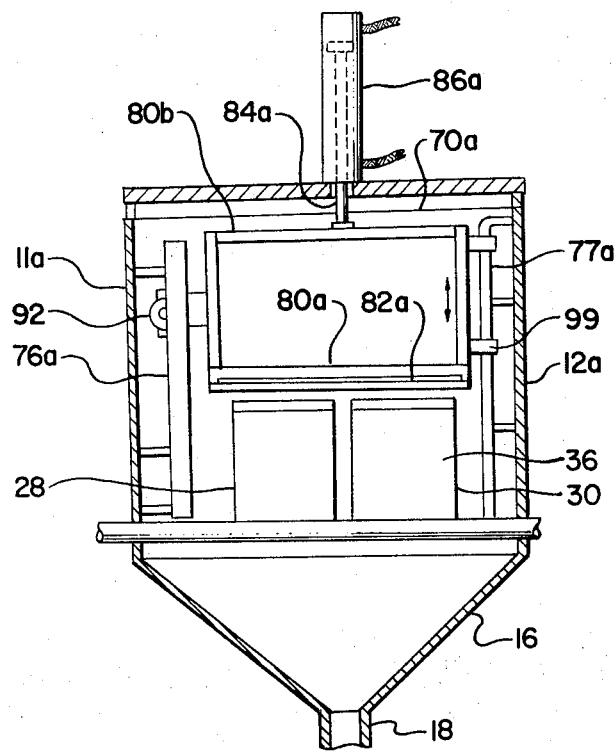
FIG. 4.    FIG. 6.
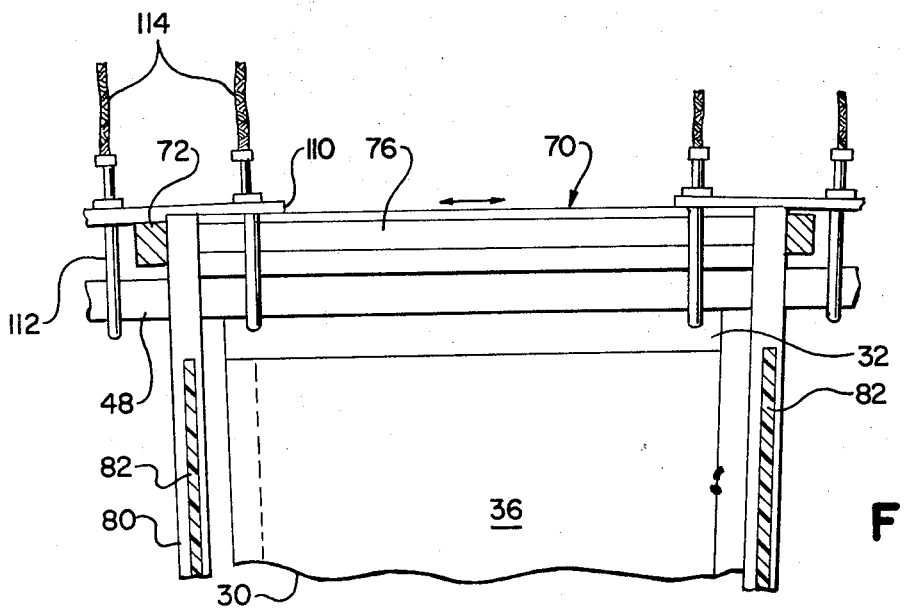
FIG. 5.
INVENTOR.
ALFRED OENRI PARMENTIER

3,762,551

SLURRY CONCENTRATOR AND FILTER APPARATUS

This invention concerns an improved slurry concentration and filtration apparatus.

There are currently a number of basic types of filtration apparatus for slurries. One type employs drum or disc filters. In this type of filtration apparatus, the filtering and straining surfaces of the drums and discs are scraped by stationary blades while the drums and discs rotate with respect to the blades. In some of these filters, water is sprayed from stationary sprayers upon the filtering surfaces to clean them. In this prior type of filtration apparatus only parts of the filtering surfaces of the drums and discs are immersed in the slurry being strained and concentrated. The useful filtration area is thus about one half or less of the total area of the drums or discs. The rotating drums and discs are generally mounted on horizontal drive shafts. This type of apparatus has rather complex and costly constructions. Precision machining of parts is required. The filters are costly to manufacture and service.

In another prior type of filtration apparatus enclosed stationary circular filter members are maintained under pressure and are traversed by scrapers carried by a rotary shaft. This type of apparatus is also costly to manufacture and maintain. A difficulty encountered with this prior apparatus is inefficient removal of collected solid material from the filter members by the scrapers when the scrapers rotate in a vertical plane and are in the ascending portion of their rotation cycle.

Another type of filter apparatus employs cylindrical filter members maintained under pressure during the filtration process. After the filtrate is removed, the collected solids are removed by injection of a wash fluid under pressure in a direction opposite to that in which the filtrate was drawn through the filter members. This type of apparatus suffers from the disadvantage that the filter members cannot be efficiently cleaned by reverse flow of wash liquid. Also, it is often desirable to restore moisture to the solid material after the filtrate is removed.

The above and other difficulties and disadvantages of prior filtration apparatus are avoided in the present apparatus. Here the apparatus has flat rectangular filtration cells of relatively simple, inexpensive construction. The filtration cells are stationary and mounted on stationary filter pipes. From time to time collected solids from the filtered slurry are removed by scrapers which loosen the solid material so that it falls to the bottom of a filter tank or reservoir from which the solid material or concentrated slurry is removed. In the present invention, the entire screening or straining area of the filter cells is always wholly immersed in the slurry being filtered. The apparatus can operate continuously, with filtrate being constantly removed, while fresh slurry is fed to the apparatus. Periodically the screening areas or surfaces are scraped clean by scrapers carried by a simple moving frame structure. The apparatus can be drained periodically and the screening areas can be flushed with a washing liquid ejected by spraying nozzles carried by the moving frame structure. The washing liquid is sprayed only during movement of the frame structure. The consumption of washing liquid is minimized and the concentration of slurry is maximized. The apparatus is arranged so that filtration and concentration of slurry can be continuous or can be performed discontinuously on predetermined quantities of slurry.

The apparatus is particularly well adapted for use in paper mills where slurries containing fillers, glue, wax, resin and other colloidal materials can be concentrated and removed from the slurries. The apparatus is adapted for automatic control and preprogrammed automatic operation.

Other and further features, objects and advantages of the invention will become apparent from the following detailed description taken together with the accompanying drawings, wherein:

FIG. 4 is an enlarged fragmentary cross sectional view similar to a portion of FIG. 2, illustrating a modification of the invention.

FIG. 5 is a fragmentary longitudinal cross sectional view similar to a portion of FIG. 3, taken on lines 5—5 of FIG. 4.

FIG. 6 is a diagrammatic representation of another slurry concentrator and filter shown in longitudinal vertical section similar to FIG. 3.

Figure 1:
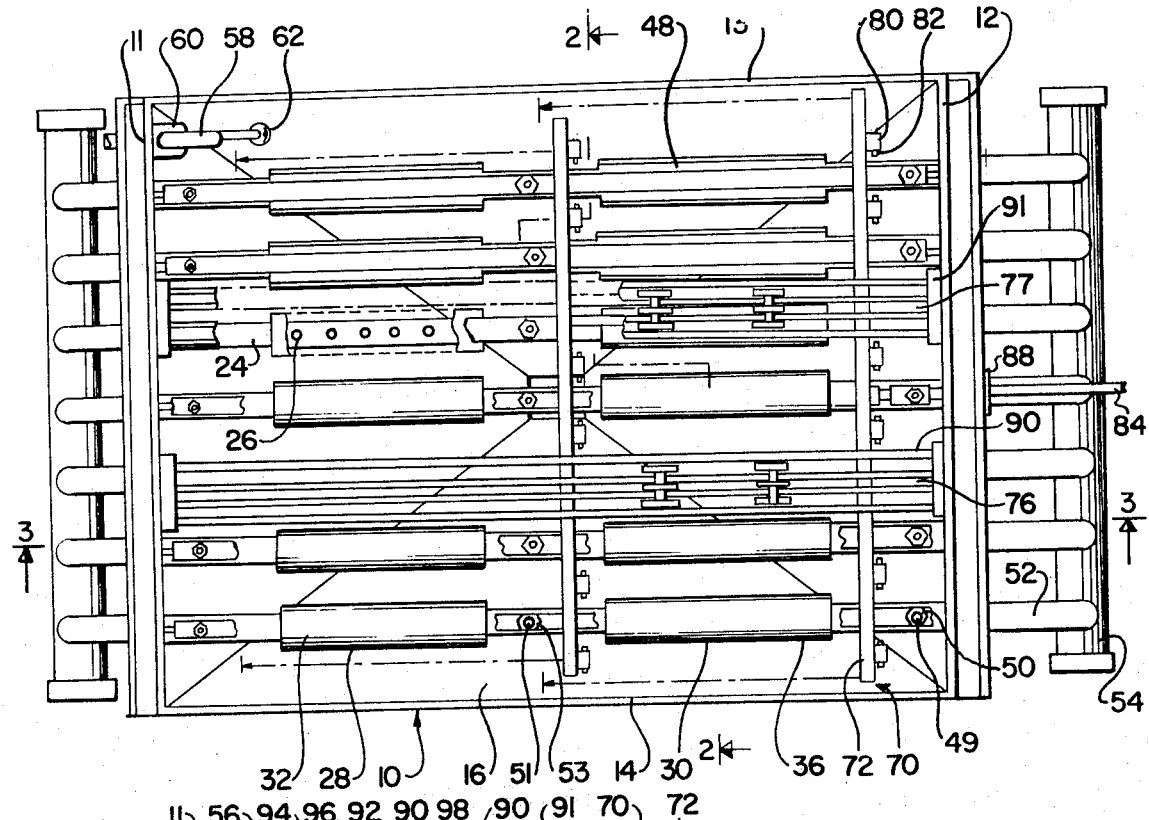
FIG. 1 is a top plan view of a slurry concentrator and filter embodying the invention, parts being broken away to show internal construction.
Figure 2:
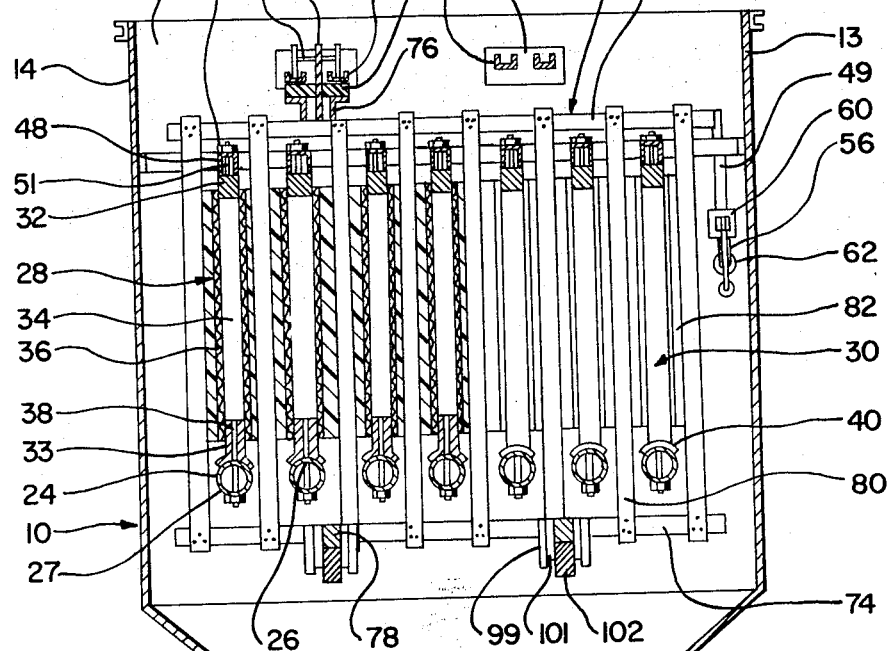
FIG. 2 is a vertical cross sectional view taken on line 2—2 of FIG. 1.
Figure 3:
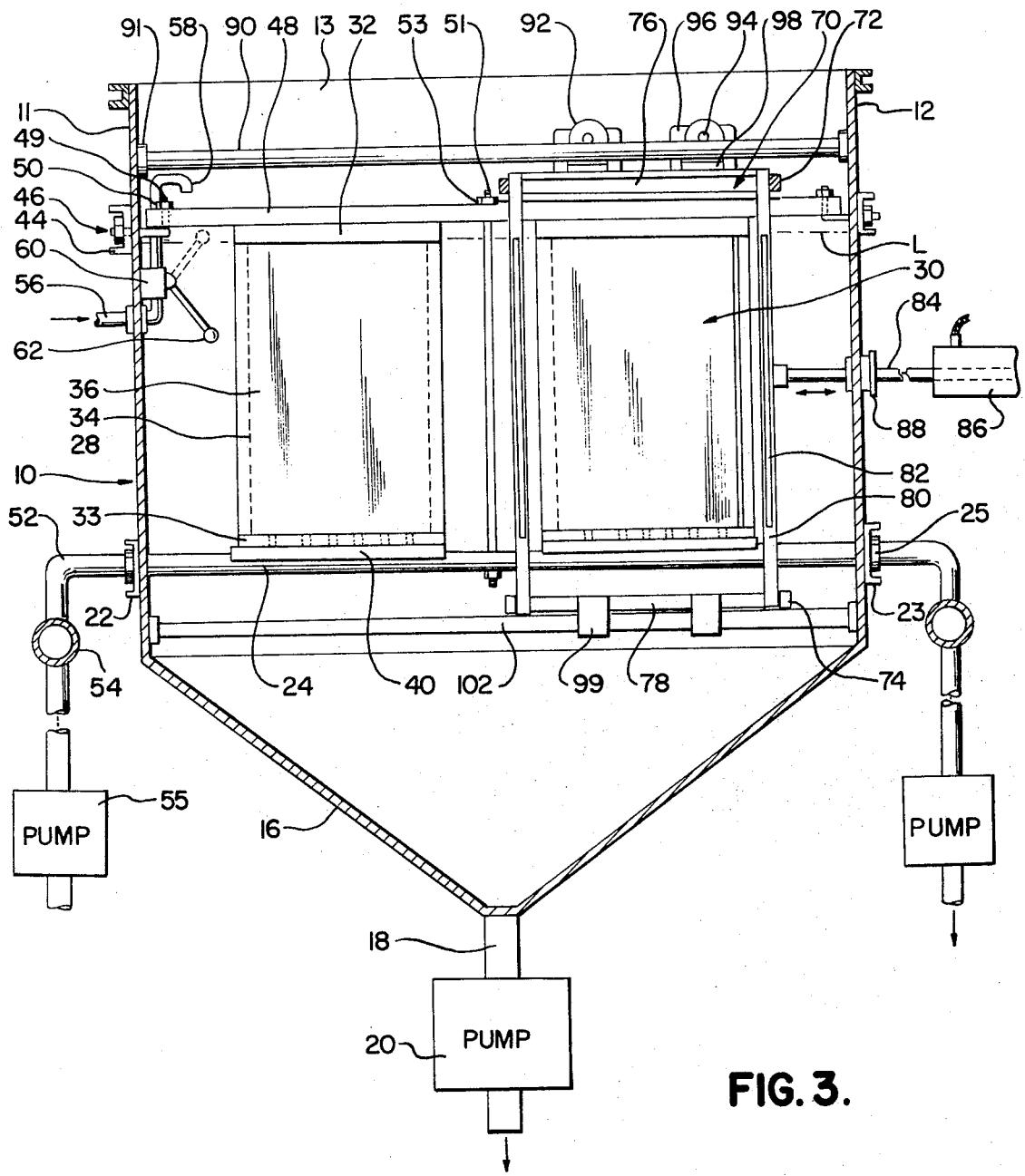
FIG. 3 is a vertical longitudinal sectional view taken on line 3—3 of FIG. 1.

Referring first to FIGS. 1-3, there is shown a slurry concentrator and filter including a tank or reservoir 10 having vertical end walls 11, 12, vertical side walls 13, 14 and a pyramidal bottom 16 tapering down to a conduit 18 leading to a pump 20 which draws a thickened slurry from the reservoir.

A pair of horizontal beams 22, 23 are secured to opposite end walls 11, 12, just above the pyramidal bottom of the reservoir. The beams have holes through which extend a plurality of horizontal pipes 24. The pipes are secured to the beams by sealing flanges 25 which form watertight joints at holes 27 in the reservoir walls 11, 12. Pipes 24 are formed with a multiplicity of holes 26 at upper sides. A pair of filter cells 28, 30 are installed on each pipe 24.

Each filter cell comprises a rigid rectangular frame formed by horizontal bars 32, 33 at the top and bottom and vertical side bars 34. Opposite vertical sides of each frame is covered by a foraminous filter screen 36 which may be a cloth mesh, metallic or plastic screening, or the like. The bottom bars 33 are formed with holes 38 registering with the holes 26 in pipes 24. Resilient sealing gaskets 40 are interposed between the bars 33 and pipes 24, and provided with holes registering with holes 38 and 26. Each pair of cells 28, 30 is disposed in a vertical coplanar position on each pipe 24. The cells on each pipe are laterally spaced from adjacent cells on adjacent pipes 24.

In order to hold the cells tightly on pipes 24, there is provided a pair of beams 44 mounted on the end walls 11, 12, and carrying clamping brackets 46. These brackets support horizontal bars 48, each of which is aligned with and extends over an aligned pair of cells 28, 30. Bars 48 overlay the upper bars 32 of the cell frames. The clamping brackets 46 include bolts 49 and nuts 50 which are tightened to press bars 48 firmly down on cells 28, 30. Brace bars 51 having threaded ends secured by nuts 53 at pipes 24 and bars 48 strengthen the cell mounting structure. Each cell is thus rendered stable and stationary in the reservoir 10 by supporting pipes 24 and beams 22, 23 at the bottom, and by beams 44, clamping brackets 46 and bars 48 at the top and brace bars 51 between the pipes 24 and bars 48.

The pipes 24 are connected by conduits 52 outside the reservoir to manifold pipes 54 at opposite ends of the reservoir. These manifold pipes can be connected to individual pumps 55 or to single pump for drawing liquid filtrate from the slurry in the tank. The slurry can be fed into the tank from a supply thereof via a pipe 56 connected to a discharge pipe 58 via a float valve 60. This valve has a buoyant ball 62 which rises and cuts off the flow of slurry into the reservoir when it reaches a predetermined level L (FIG. 3).

The concentrated, viscous material which collects on the parallel vertical filter screens 36 can be removed by scraping by means which is now described. A frame structure 70 is mounted in the reservoir 10. This frame structure includes two upper horizontal transversely extending cross bars 72 and two lower transverse bars 74 spaced apart longitudinally of the reservoir 10. Bars 72 and 74 are perpendicular to the cells 28, 30. The upper bars 72 are connected together by horizontal longitudinally extending upper girders 76, 77 and lower bars 74 are connected by horizontal bars 78. Between bars 72 and 74 are secured vertical slats 80 which extend between the cells parallel to and equidistant from screens 36 on both sides of cells 28, 30. The slats 80 carry scraper blades 82 which may be rigid or flexible. The blades extend the full lengths of screens 36 and scrape the screens when the frame structure 70 is moved longitudinally of the reservoir in a direction parallel to cells 28, 30.

The frame structure is moved by a horizontal piston rod 84 extending axially outward of a hydraulic drive cylinder 86. Rod 84 extends through a packing ring 88 in end wall 12 of the reservoir. The frame structure is movably supported by two pairs of stationary horizontal channel shaped tracks 90 secured between the end walls 11, 12 on mounting plates 91. On these tracks roll carriages comprising wheels 92 engaged on cross axles 94. The axles extend through vertical carriage plates 96 secured to and extending upwardly from girders 76, 77. Wear resistant smooth spacer blocks 98 on upper sides of girders 76, 77 prevent vertical and lateral movement of the frame structure 70 as it is carried along by the wheels 92 on tracks 90. To each lower bar 78 are attached depend-ing guide plates 99 provided with inner wear resistant spacer blocks 101 sliding along stationary horizontal guide rails 102 mounted between end walls 11, 12. Rails 102 are parallel to and disposed in the same vertical planes as upper tracks 90.

The hydraulic cylinder reciprocates piston rod which moves the frame structure 70 through the entire longitudinal width of cells 28, 30 so that the entire surfaces of screens 36 are scraped by blades 82. The frame structure can be reciprocated one or more times during each filtration cycle to scrape concentrated slurry mud from the screens. This mud will fall to the bottom hopper 16 and will be drawn off by pump 20. The water or other liquid content of the slurry is drawn off by pumps 55 applying suction through pipes 54, 52 and 24 in turn. The slurry is strained by the filter screens so that a clear filtrate passes into pipes 24. If desired, the frame structure 70 can be held stationary until a desired quantity of liquid has been strained from the slurry. The remaining concentrated on the screens 36 can then be scraped off by blades 82 while the frame structure is moved back and forth one or more times.

A number of modifications of the basic structure illustrated in FIGS. 1-3 and described above can be made. For example, any desired number of filtration cells can be installed on pipes 24. There can be a singel cell on each pipe, two cells as shown in the drawings or more than two cells. The moving frame structure 70 will be provided with one scraper blade 82 for each longitudinal line of filter screens 36. If desired, the cells can be divided into groups, with a separate movable frame structure 70 for scraping each group of cells. A single hydraulic cylinder or jack 86 can be arranged to move all frame, or a separate cylinder can be provided for each movable frame structure. It is also possible to provide hydraulic cylinders 86 at opposite ends of the reservoir, with one cylinder arranged to move the frame structure in one direction and the other cylinder arranged to move the frame structure in the opposite direction.

It is possible to employ the apparatus for continuous concentration of slurry, by continuously draining off liquid while fresh slurry is fed into the reservoir via inlet pipe 58. The apparatus can also be used to concentrate a single charge of slurry at a time. To do this the slurry will be fed into the reservoir until level L is reached. The supply of slurry will then be shut off at the source thereof and filtration can then start by operating pumps 55. When the desired quantity of liquid is removed, the solid caked material collected on screens 36 can be scraped off. It will be apparent therefore that the apparatus can serve as a continuous slurry concentrator, or as a filtering device for separate charges of slurry.

In some installations it may be desirable to wash the screens 36 after each filtration cycle or after a number of such cycles. For this purpose the arrangement of FIGS. 4 and 5 can be used. On cross bars 72 of frame structure 70 are mounted brackets 110 carrying spray nozzles 112 to which flexible pipes 114 are connected. Pipes 114 are connected to a supply of washing liquid which will be fed at high pressure. The nozzles 112 will direct sprays of washing liquid on the screens to clean them while the frame structure 70 is moved back and forth with respect to the filtration cells 28, 30. It will be noted that the nozzles 112 are arranged in pairs at opposite sides of the cells and at opposite sides of each scraper blade 82. There is a pair of nozzles at opposite upper corners of each screen 36.

The frame structure 70 as shown in FIGS. 1–5 is arranged to move horizontally. It is possible to arrange the frame structure to move vertically. This is indicated diagrammatically in FIG. 6 where the frame structure 70a moves vertically on vertical tracks 76a and vertical guide rail 77a supported by end walls 11a, 12a of reservoir or tank 10a. The frame structure includes horizontal bars 80a which carry horizontal scraper blades 82a. The blades move vertically with the frame structure to scrape screens 36 of filter cells 28, 30. The reciprocating cylinder 86a mounted above the tank on support 86'. Axially vertical piston rod 84a is connected to upper bars 80b of the frame structure.

Suitable auxiliary control apparatus of conventional type including control valves, switches and the like will be provided for operating the several pumps, slurry supply and hydraulic cylinder of the apparatus. The control apparatus can be arranged to operate automatically to perform a timed, programmed filtration cycle.

The filtration apparatus shown in the drawings and described above makes it simple and convenient to clear and clean large filtration areas, in an apparatus of minimum size. The apparatus is relatively simple in construction, easy to operate, relatively inexpensive to install and maintain.

I claim:

1. A slurry concentrator and filter apparatus, comprising a reservoir having vertical walls and closed bottom for containing a quantity of slurry to be filtered and concentrated; a plurality of horizontal pipes disposed in laterally spaced positions and extending between opposite walls of the reservoir just above the bottom thereof, said pipes having a plurality of spaced holes formed in upper sides thereof; a plurality of filter cells respectively mounted on said pipes, each of said cells comprising a generally rectangular frame with flat, rectangular filter screens applied to opposite sides of the frame, said frame having bottom openings registering with the holes in the pipes on which the filter cell is mounted; means for supporting the cells in vertical positions on the pipes with said screens disposed in spaced vertical planes parallel to axis of the pipes; automatic cyclic means for cyclically drawing liquid from the slurry automatically repeatedly through said cells and pipes, for concentrating the slurry on said screens; means supporting a plurality of straight scraper blades in parallel disposition in the reservoir with scraping edges of the blades vertically disposed in the planes of the respective filter screens; means for said blades simultaneously horizontally moving across the screens and remove concentrated slurry material therefrom; a movable frame structure in the reservoir carrying said blades and the means for moving the blades comprising automatic mechanical reciprocation means connected to the frame structure to move the blades across the screens in opposite directions cyclically automatically alternately with continual filtering cycles; and a water spray means arranged on opposite sides of the screens and mounted on said frame structure for movement with the blades to spray washing liquid on the screens while the blades scrape the screens.

2. A slurry concentrator and filter apparatus as defined in claim 1, wherein the bottom of the reservoir is tapered to define a hopper so that the material scraped from the screens falls into the hopper; and means for removing the material collected in the hopper.

3. A slurry concentrator and filter apparatus as defined in claim 1, in which said spray means includes a plurality of water spray nozzles arranged on opposite sides of the screens.

* * * * *